United States Patent
Saleh et al.

(10) Patent No.: US 10,706,609 B1
(45) Date of Patent: Jul. 7, 2020

(54) EFFICIENT DATA PATH FOR RAY TRIANGLE INTERSECTION

(71) Applicant: Advanced Micro Devices, Inc., Santa Clara, CA (US)

(72) Inventors: Skyler Jonathon Saleh, La Jolla, CA (US); Ruijin Wu, La Jolla, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 20 days.

(21) Appl. No.: 16/219,816

(22) Filed: Dec. 13, 2018

(51) Int. Cl.
| | |
|---|---|
| *G06T 15/06* | (2011.01) |
| *G06T 15/00* | (2011.01) |
| *G06T 15/80* | (2011.01) |
| *G06F 17/16* | (2006.01) |
| *G06F 9/38* | (2018.01) |

(52) U.S. Cl.
CPC ............ *G06T 15/06* (2013.01); *G06F 9/3887* (2013.01); *G06F 17/16* (2013.01); *G06T 15/005* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 2012/0075287 | A1* | 3/2012 | Park | G06T 15/06 345/419 |
| 2017/0293995 | A1* | 10/2017 | Saleh | G06T 1/20 |
| 2020/0051314 | A1* | 2/2020 | Laine | G06T 15/06 |

OTHER PUBLICATIONS

Woop et al.; "Watertight Ray/Triangle Intersection"; 2013; Journal of Computer Graphics Techniques; vol. 2, No. 1; pp. 65-82 (Year: 2013).*
Stich, M., "Introduction to NVIDIA RTX and DirectX Ray Tracing," NVIDIA Developer Blog, https://devblogs.nvidia.com/introduction-nvidia-rtx-directx-ray-tracing/, Mar. 19, 2018 (Retrieved Dec. 13, 2018).
Owen, G. Scott, "Ray—Box Intersection", https://www.siggraph.org//education/materials/HyperGraph/raytrace/rtinter3.htm, Apr. 1, 1998 (Retrieved Dec. 13, 2018).

* cited by examiner

*Primary Examiner* — Peter Hoang
(74) *Attorney, Agent, or Firm* — Volpe and Koenig, P.C.

(57) ABSTRACT

Described herein is a technique for performing ray-triangle intersection without a floating point division unit. A division unit would be useful for a straightforward implementation of a certain type of ray-triangle intersection test that is useful in ray tracing operations. This certain type of ray-triangle intersection test includes a step that transforms the coordinate system into the viewspace of the ray, thereby reducing the problem of intersection to one of 2D triangle rasterization. However, a straightforward implementation of this transformation requires floating point division, as the transformation utilizes a shear operation to set the coordinate system such that the magnitudes of the ray direction on two of the axes are zero. Instead of using the most straightforward implementation of this transform, the technique described herein scales the entire coordinate system by the magnitude of the ray direction in the axis that is the denominator of the shear ratio, removing division.

20 Claims, 6 Drawing Sheets

EFFICIENT DATA PATH FOR RAY TRIANGLE INTERSECTION

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein is a technique for performing a hardware-accelerated ray-triangle intersection test where the hardware acceleration unit does not include a floating point division unit. A division unit would be useful for a straightforward implementation of a certain type of ray-triangle intersection test that is useful in ray tracing operations. This certain type of ray-triangle intersection test includes a step that transforms the coordinate system into the viewspace of the ray, thereby reducing the problem of intersection to one of 2D triangle rasterization. However, a straightforward implementation of this transformation requires floating point division, as the transformation utilizes a shear operation to set the coordinate system such that the magnitudes of the ray direction on two of the axes are zero. This shear operation, when applied to the vertices of the triangle, requires multiplication by a ratio of the ray direction magnitude in one axis to the ray direction magnitude in another axis, which requires division. Instead of using the most straightforward implementation of this transform, the technique described herein scales the entire coordinate system by the magnitude of the ray direction in the axis that is the denominator of the shear ratio, which removes division. To obtain a non-scaled time of intersection of the ray and the triangle, the intersection time is returned as a separate numerator and denominator to the shader core, with the denominator scaled by the same magnitude that the coordinate system is scaled by. In this manner, division is removed from the above ray-triangle intersection test hardware unit. Additional details are provided below.

Figure 1:
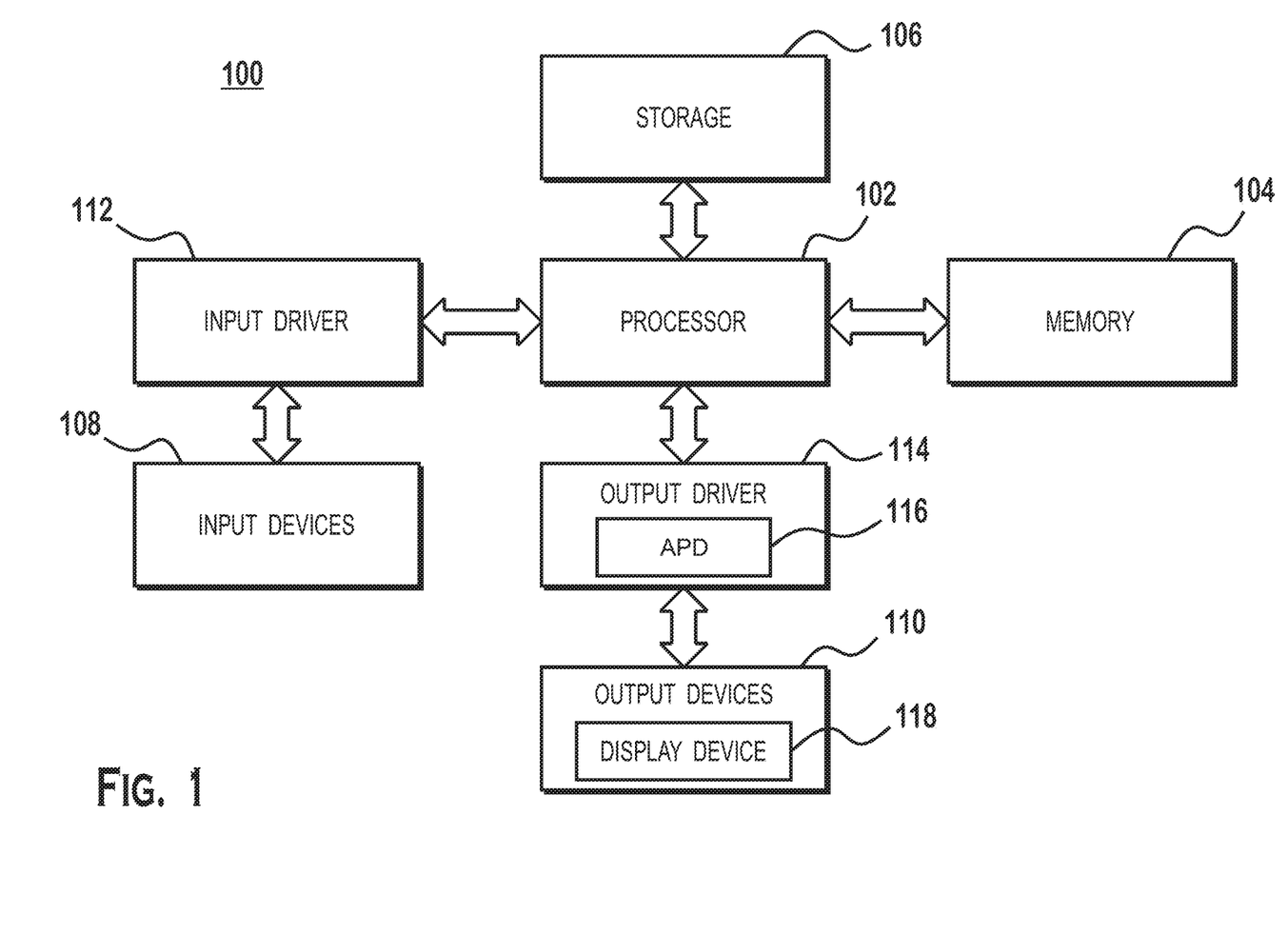
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
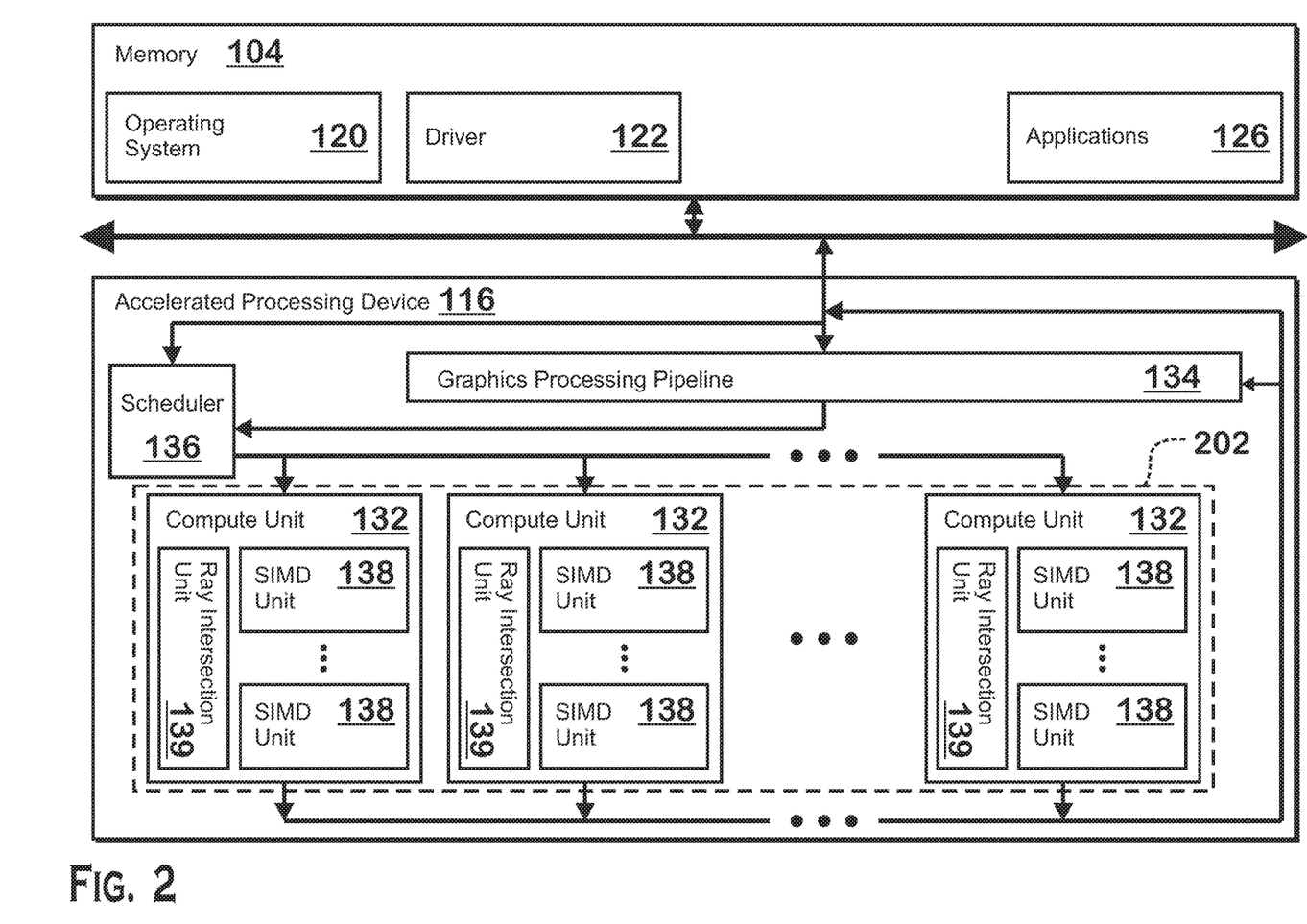
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below. Each compute unit 132 also includes a fixed function hardware accelerator for performing a test to determine whether rays intersect triangles, which is the ray intersection unit 139.

Figure 3:
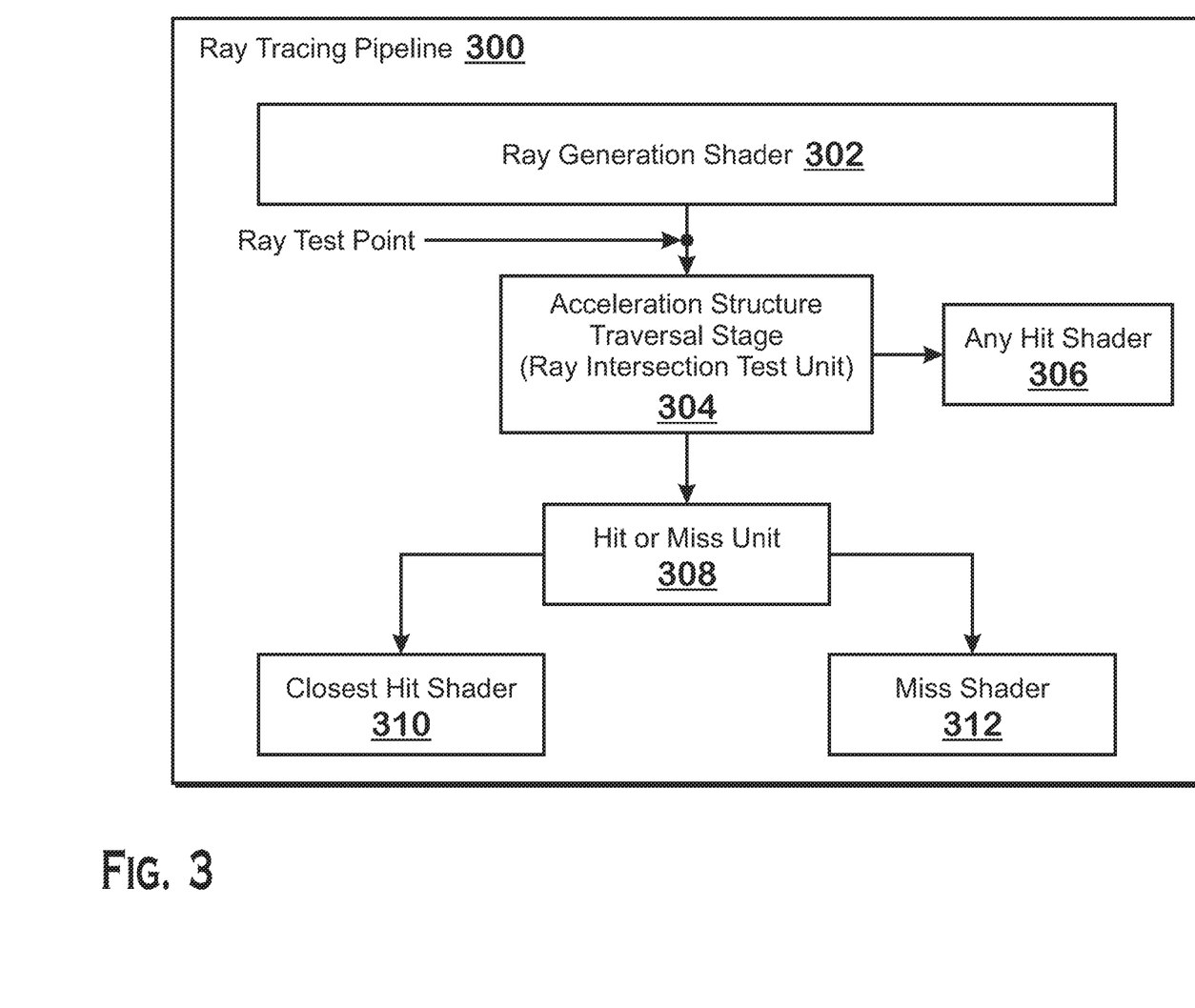
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122. The acceleration structure traversal stage 304 performs the ray intersection test to determine whether a ray hits a triangle. The operations of the acceleration structure traversal stage are performed by the ray intersection test unit 139. The various programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware (e.g., in the ray intersection unit 139), or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit.

The ray tracing pipeline 300 operates in the following manner. A ray generation shader 302 is executed. The ray generation shader 302 sets up data for a ray to test against a triangle and requests the ray intersection test unit 139 test the ray for intersection with triangles.

The ray intersection test unit 139 traverses an acceleration structure at the acceleration structure traversal stage 304, which is a data structure that describes a scene volume and objects within the scene, and tests the ray against triangles in the scene. The hit or miss unit 308, which may be part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader. Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 139 reports as being hit is fully transparent. Because the ray intersection test unit 139 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
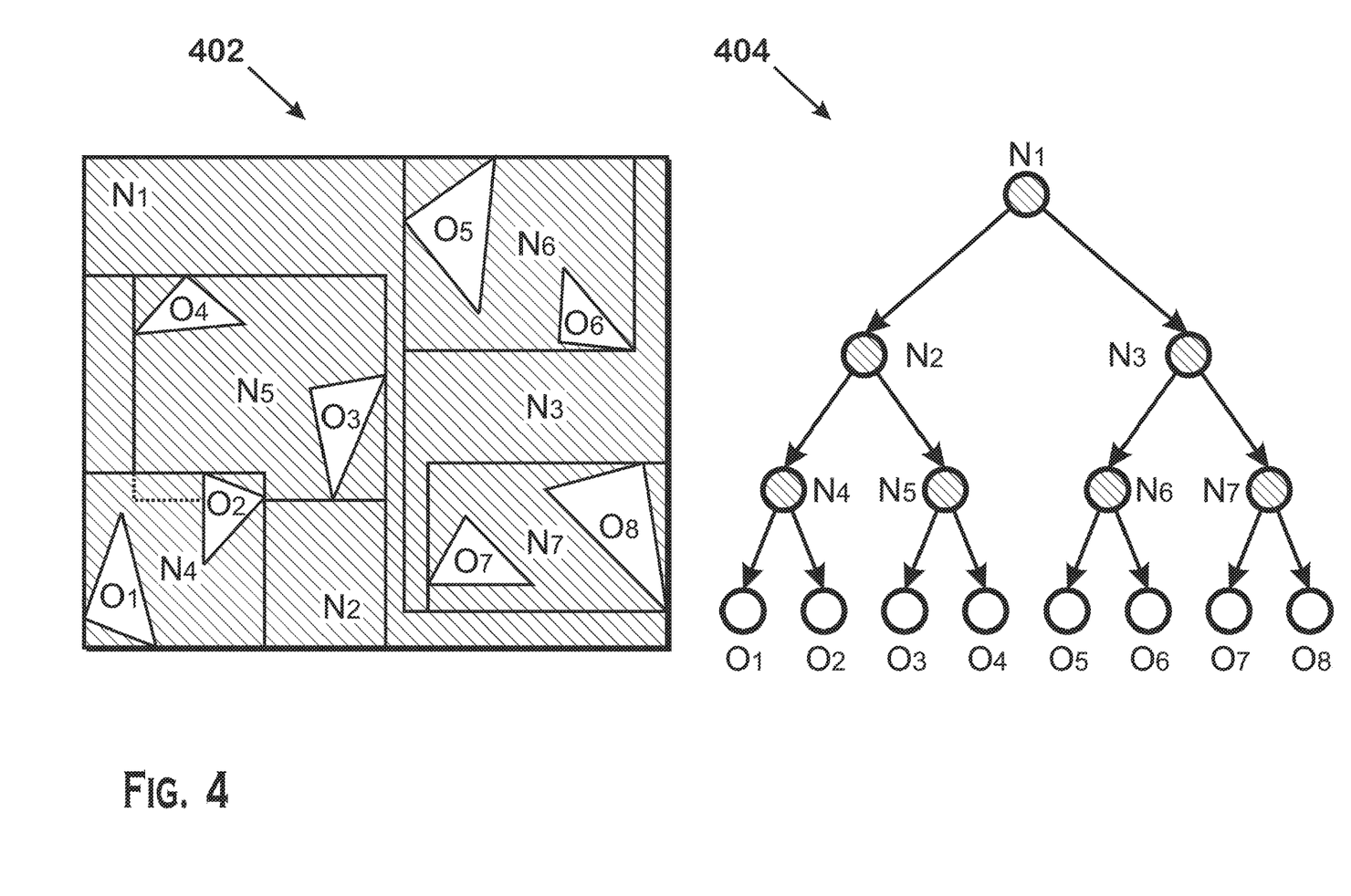
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

The ray-triangle test involves asking whether the ray hits the triangle and also the time to hit the triangle (time from ray origin to point of intersection). Conceptually, the ray-triangle test involves projecting the triangle into the viewspace of the ray so that it is possible to perform a simpler test similar to testing for coverage in two dimensional rasterization of a triangle as is commonly performed in graphics processing pipelines. More specifically, projecting the triangle into the viewspace of the ray transforms the coordinate system so that the ray points downwards in the z direction and the x and y components of the ray are 0 (although in some modifications, the ray may point upwards in the z direction, or in the positive or negative x or y directions, with the components in the other two axes being zero). The vertices of the triangle are transformed into this coordinate system. Such a transform allows the test for intersection to be made by simply asking whether the x, y coordinates of the ray fall within the triangle defined by the x, y coordinates of the vertices of the triangle, which is the rasterization operation described above.

Figure 5:
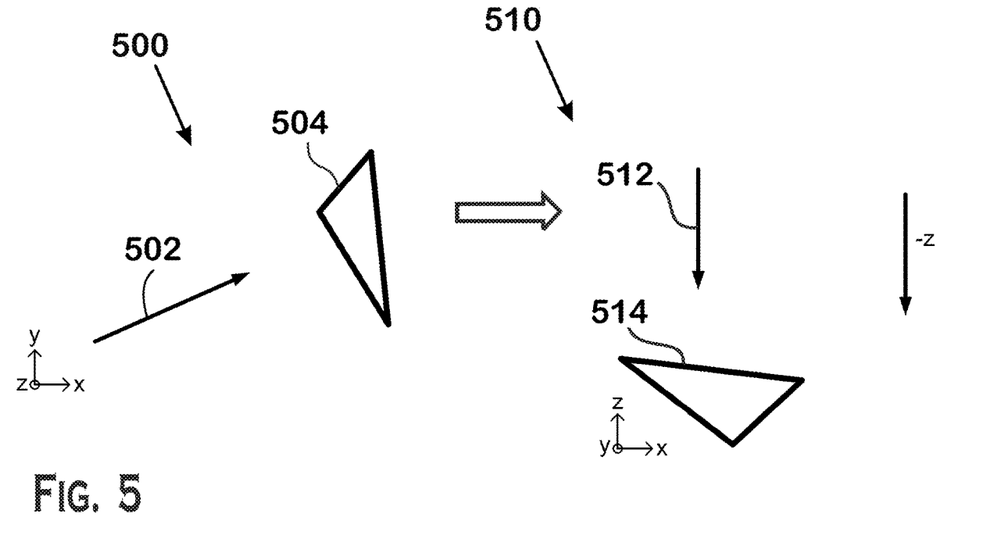
FIG. 5 illustrates a coordinate transform for performing a ray-triangle intersection test, according to an example.

This transformation is illustrated in FIG. 5. The ray 502 and triangle 504 are shown in coordinate system 500 before the transformation. In the transformed coordinate system 510 coordinate system, the ray 512 is shown pointing in the −z direction and the triangle 514 is shown in that coordinate system 510 as well.

Figure 6:
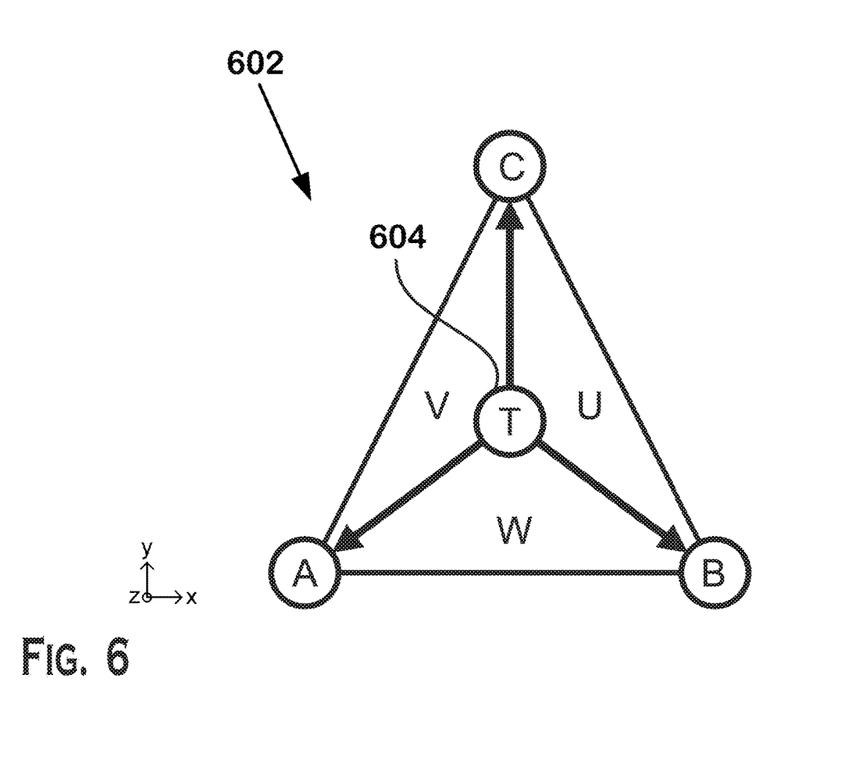
FIG. 6 illustrates the ray-triangle intersection test as a rasterization operation, according to an example.

FIG. 6 illustrates the ray intersection test as a rasterization operation. Specifically, vertices A, B, and C define the triangle 514 and vertex T is the origin of the ray 512. Testing for whether the ray 512 intersects the triangle 514 is performed by testing whether vertex T is within triangle ABC. This will be described in further detail below.

Additional details of the ray-triangle test are now provided. First, the coordinate system is rotated so that the z-axis is the dominant axis of the ray (where "dominant axis" means the axis that the ray travels the quickest in). This rotation is done to avoid some edge cases when the z component of the ray direction is 0 and the poorer numerical stability that occurs when the z component of the ray direction is small. The coordinate system rotation is performed in the following manner:

```
int kz=0;
float largest_dim=fabs(ray_dir.x);
if(largest_dim<fabs(ray_dir.y)){
    kz=1;
    largest_dim=fabs(ray_dir.y);
}
if(largest_dim<fabs(ray_dir.z)){
    kz=2;
    largest_dim=fabs(ray_dir.z);
}
if (kz==2){
    ray_dir=ray_dir;
    ray_origin=ray_origin;
    v0=v0;
    v1=v1;
    v2=v2;
}else if(kz==1){
    ray_dir=ray_dir.zxy;
    ray_origin=ray_origin.zxy;
    v0=v0.zxy;
    v1=v1.zxy;
    v2=v2.zxy;
}else{
    ray_dir=ray_dir.yzx;
    ray_origin=ray_origin.yzx;
    v0=v0.yzx;
    v1=v1.yzx;
    v2=v2.yzx;
}
```

Here, kz is a helper variable used to determine which way to rotate the axes, largest_dim is the largest dimension of the ray, ray_dir is a float3 defining the ray direction, ray_origin is a float3 defining the ray_origin, v0, v1, v2 are float3's defining the vertices of the triangle, and fabs( ) is the floating point absolute value function. Appending .zxy or .yzx to a float3 rotates the float3. .zxy causes the new x component to be the old z component, the new y component to be the new x component, and the new z component to be the old z component. .yzx causes the new x component to be the old y component, the new y component to be the old z component, and the new z component to be the old x component. The above pseudo-code determines which component of the ray_direction vector has the largest absolute value. If the z component is the largest, kz is set to 2, and no rotation is performed. If the y component is the largest, kz is set to 1 and the ray and vertices are rotated such that the z axis is the old y axis. If the x component is the largest, kz is set to 0 and the ray and vertices are rotated such that the z axis is the old x axis.

Next, the vertices are all translated to be relative to the ray_origin:
float3 v0_rel=v0-ray_origin;
float3 v1_rel=v1-ray_origin;
float3 v2_rel=v2-ray_origin;

Next, to simplify the calculation of the intersection, a linear transformation is applied to the ray and the vertices of the triangle to allow the test to be performed in 2D. This linear transformation is done by multiplying each of the vertices and the ray_direction by the transformation matrix M. The ray direction can be transformed like this because ray_origin is at <0,0,0> due to the above translation step. Matrix M is the following:

$$M = \begin{bmatrix} \text{ray\_dir}.z & 0.0 & -\text{ray\_dir}.x \\ 0.0 & \text{ray\_dir}.z & -\text{ray\_dir}.y \\ 0.0 & 0.0 & 1.0 \end{bmatrix}$$

The matrix multiplication occurs in the following manner:
float Ax=v0_rel.x*ray_dir.z-ray_dir.x*v0_rel.z;
float Ay=v0_rel.y*ray_dir.z-ray_dir.y*v0_rel.z;
float Az=v0_rel.z;
float Bx=v1_rel.x*ray_dir.z-ray_dir.x*v1_rel.z;
float By=v1_rel.y*ray_dir.z-ray_dir.y*v1_rel.z;
float Bz=v1_rel.z;
float Cx=v2_rel.x*ray_dir.z-ray_dir.x*v2_rel.z;
float Cy=v2_rel.y*ray_dir.z-ray_dir.y*v2_rel.z;
float Cz=v2_rel.z;

The ray direction does not need to be explicitly transformed by matrix M because matrix M is constructed such that the transformed ray direction will always be <0, 0, ray_dir.z>. This is because of the following:

ray_dir.x=ray_dir.x*ray_dir.z-ray_dir.z*ray_dir.x=0 ray_dir.y=ray_dir.y*ray_dir.z-ray_dir.z*ray_dir.y=0 ray_dir.z=ray_dir.z

Conceptually, the matrix M scales and shears the coordinates such that the ray direction only has a z component of magnitude ray_dir.z. With the vertices transformed in the above manner, the ray-triangle test is performed as the 2D rasterization test. FIG. 6 illustrates a triangle 602 having vertices A, B, and C. The ray 604 is shown as well (point T). Because of the transformations performed on the vertices and the ray, the ray is pointing in the −z direction. In addition, because the triangle is projected onto the coordinate system in which the ray points in the −z direction, the triangle-ray test is reformulated as a test for whether the origin of the ray is within the triangle defined by the x, y coordinates of the vertices A, B, and C. In addition, because of the above transformations: the ray origin is at 2D point (0,0); the point of intersection between the ray and the triangle (T) is also at 2D point (0,0); and the distances between the vertices of the triangle, which are A-T for vertex A, B-T for vertex B, and C-T for vertex C, are simply A, B, and C because the point of intersection between the ray and the triangle is at (0,0).

Next, barycentric coordinates for the triangle, U, V, W (shown in FIG. 6) are calculated in the following manner:

$U$=area(Triangle $CBT$)=0.5*($C \times B$)

$V$=area(Triangle $ACT$)=0.5*($A \times C$)

$W$=area(Triangle $BAT$)=0.5*($B \times A$)

This calculation is simplified to the following:
float U=Cx*By−Cy*Bx;
float V=Ax*Cy−Ay*Cx;
float W=Bx*Ay−By*Ax;
where division is not utilized because the division by 2 is canceled out in the final result.

The signs of U, V, and W indicate whether the ray intersects the triangle. More specifically, if U, V, and W are all positive, or if U, V, and W are all negative, then the ray is considered to intersect the triangle because the point T is inside the triangle in FIG. 6. If the signs of U, V, and W are different, then the ray does not intersect the triangle because the point T is outside of the triangle in FIG. 6. If exactly one of U, V, and W is zero, then the point T lies on the line that runs through the edge corresponding to that coordinate. In this situation, the point T is on an edge of the triangle 602 if the signs of the other two coordinates are the same, but if the signs of the other two coordinates are different, then the point is not on an edge of the triangle. If exactly two of U, V, and W are zero, then the point T is considered to be on a corner of the triangle. If all of U, V, and W are zero, then the triangle is a zero area triangle. One additional point is that point T may be inside the triangle in 2D (indicated as the ray intersecting the triangle above) but may still miss the triangle in 3D space if the ray is behind the triangle. The sign of t, described below, indicates whether the ray is behind (and thus does not intersect) the triangle. Specifically, if the sign is negative, the ray is behind the triangle and does not intersect the triangle. If the sign is positive or 0, then the ray intersects the triangle.

In various implementations, any of the situations where the point is on an edge or a corner, or in the situation where the triangle is a zero area triangle, may be considered either a hit or a miss. In other words, the determination of whether the point lying on an edge is a hit or a miss, and/or the determination of whether the point lying on a corner is a hit or a miss, is dependent on a specific policy. For example, in some implementations, all instances where the point lies on an edge or a corner are considered to be hits. In other implementations, all such instances are considered to be misses. In yet other implementations, some such instances (such as the point T lying on edges facing in specific directions) are considered hits while other such instances are considered misses.

In addition, the time t at which the ray hits the triangle is determined. This is done using the barycentric coordinates of the triangle (U, V, and W) already calculated, by interpolating the Z value of all of the triangle vertices. First, the z component of point T (the intersection point of the ray with the triangle) is calculated:

$$T.z = \frac{U*Az + V*Bz + W*Cz}{U+V+W}$$

where Az is the z component of vector A, Bz is the z component of vector B, Cz is the z component of vector C, and U, V, and W are the barycentric coordinates calculated above. T.x and T.y are zero, and thus T is (0, 0, T.z). The time t is calculated as follows:

$$t = \frac{\text{distance(ray\_origin, } T)}{\text{length(ray\_dir)}} = \frac{\text{length}(T)}{\text{length(ray\_dir)}} = \frac{T.z}{\text{ray\_dir}.z}$$

where distance( ) represents the distance between two points, length( ) represents the length of a vector. The final expression for time of intersection t is as follows:

$$t = \frac{U*Az + V*Bz + W*Cz}{(U+V+W)*\text{ray\_dir}.z}$$

Figure 7:
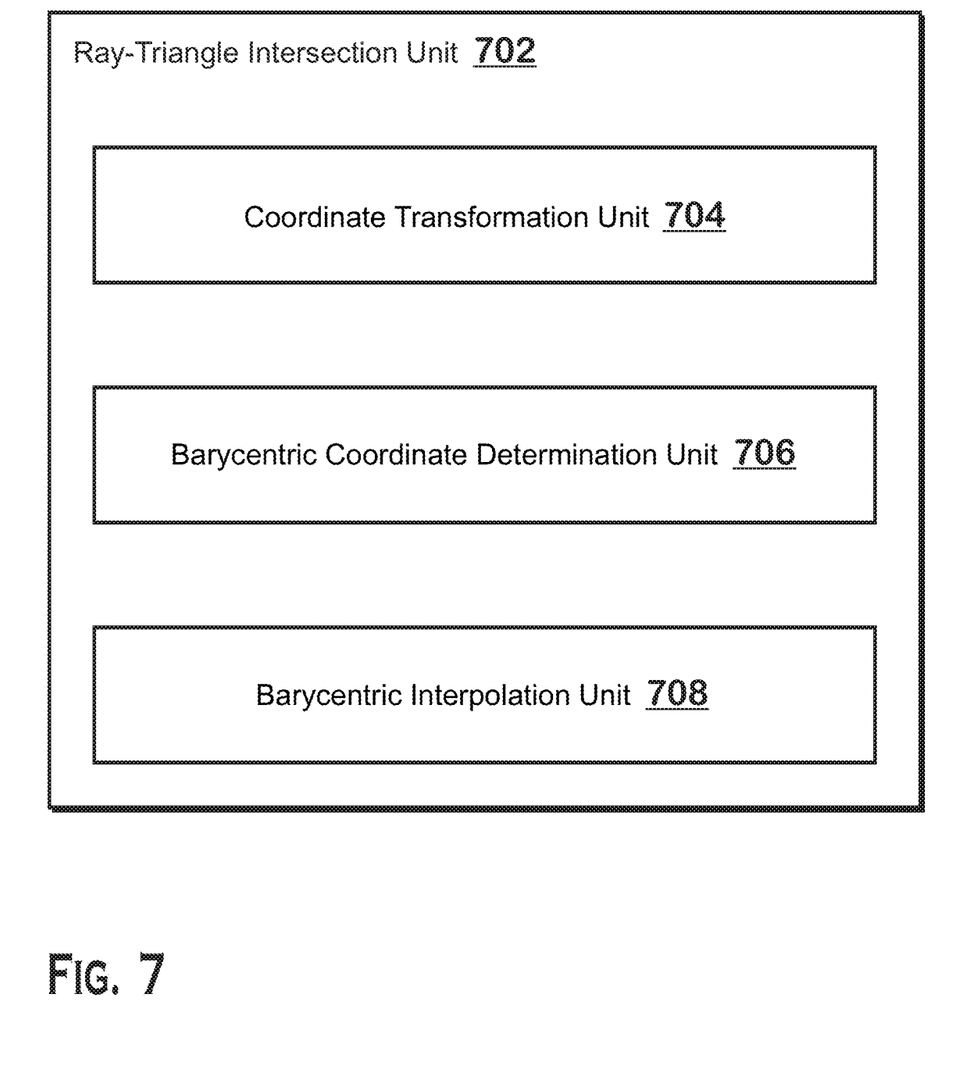
FIG. 7 illustrates a hardware implementation of a ray-triangle intersection unit, according to an example.

This value is provided by the hardware intersection unit to the shader (e.g., any of the shaders in FIG. 3) in numerator and denominator form (where t_num is the numerator of t and t_denom is the denominator of t):
float $t\_num=U*Az+V*Bz+W*Cz;$
float $t\_denom=(U+V+W)*\text{ray\_dir}.z$ The above technique for determining whether a ray intersects a triangle is implemented in hardware without a divider, where a divider is a hardware unit that performs mathematical division. FIG. 7 illustrates a hardware implementation of a ray-triangle intersection unit 702, which is a part of the ray intersection unit 139, according to an example. The ray-triangle intersection unit 702 does not include a divider. Not including a divider is beneficial because a divider consumes a large amount of computer chip die area and power. Thus, not including a divider improves the amount of die area taken up by the ray intersection unit 139.

A straightforward implementation of the above technique for performing ray-triangle intersection would include a divider. This is because a straightforward implementation would be one in which the coordinate transformation (multiplication of the vertices by matrix M) does not scale the coordinate system by the magnitude of the z component of the ray_direction. In not scaling the coordinate system, a simple barycentric interpolation between the z coordinates of the triangle vertices would be used to determine the time that the ray hits the triangle (t, above). However, such a straightforward implementation would require a divider in the ray-triangle intersection unit 702, because the required matrix would be:

$$M_{alternate} = \begin{bmatrix} 1.0 & 0.0 & -\text{ray\_dir}.x/\text{ray\_dir}.z \\ 0.0 & 1.0 & -\text{ray\_dir}.y/\text{ray\_dir}.z \\ 0.0 & 0.0 & 1.0/\text{ray\_dir}.z \end{bmatrix}$$

This matrix would allow time t to be calculated as:

$$t = \frac{U*Az + V*Bz + W*Cz}{U+V+W}$$

which is a straightforward barycentric interpolation of the z components of vertices A, B, and C. However, multiplication of the vertices of the triangle by this matrix would require division as follows:

float Ax=v0_rel.x-ray_dir.x*v0_rel.z/ray_dir.z;
float Ay=v0_rel.y-ray_dir.y*v0_rel.z/ray_dir.z;
float Az=v0_rel.z/ray_dir.z;
float Bx=v1_rel.x-ray_dir.x*v1_rel.z/ray_dir.z;
float By=v1_rel.y-ray_dir.y*v1_rel.z/ray_dir.z;
float Bz=v1_rel.z/ray_dir.z;
float Cx=v2_rel.x-ray_dir.x*v2_rel.z/ray_dir.z;
float Cy=v2_rel.y-ray_dir.y*v2_rel.z/ray_dir.z;
float Cz=v2_rel.z/ray_dir.z;

As can be seen, with this matrix multiplication, determining each component of each vertex of the triangle would require division by ray_dir.z. By scaling the matrix M by ray_dir.z, this division is avoided. Moreover, the actual time to intersection (rather than scaled time to intersection) is recovered by multiplying the denominator of the above formula (U+V+W) by the scaling factor ray_dir.z.

FIG. 7 is a block diagram illustrating a ray-triangle intersection unit 702 that determines whether a ray hits a triangle, according to an example. In some implementations, the ray-triangle intersection unit 702 is a part of the ray intersection unit 139 of FIG. 2. The ray-triangle intersection unit 702 is a fixed function hardware unit including circuitry that implements the techniques described herein.

The coordinate transformation unit 704 projects the vertices of the triangle into the viewspace of the ray. This coordinate transformation unit 704 performs this projection by performing the steps described above, of rotating the coordinate system so that the z-axis is the dominant axis, translating the vertices of the triangle to be relative to the ray origin, and multiplying the translated vertices by matrix M. Multiplying the translated vertices by M causes the vertices to be in a coordinate system in which the ray has x and y direction components of 0 and each of the vertices and the ray have z components that are unmodified by the coordinate transformation unit 704. To implement these functions, the coordinate transformation unit 704 includes a number of adders and multipliers, as well as other fixed function circuitry, but does not include a divider because multiplication by matrix M does not use division.

The barycentric coordinate determination unit 706 determines the barycentric coordinates U, V, and W, as shown in FIG. 6 and as described above. The barycentric coordinates describe the location of the point of intersection of the ray relative to the vertices of the triangle in two-dimensional space. The barycentric coordinate determination unit 706 includes adders and multipliers to determine the barycentric coordinates. The barycentric interpolation unit 708 generates t_num and t_denom, which are the numerator and denominator of the time for the ray to intersect the triangle, t, described above. The barycentric interpolation unit 708 includes adders and multipliers to perform the above-described operations for t_num and t_denom. Notably, t_denom includes U, V, and W, each multiplied by ray_dir.z, which are then summed together. This multiplication accounts for the scaling by ray_dir.z, introduced by matrix M, which allows the ray-triangle intersection unit 702 to not include a divider. The ray-triangle intersection unit 702 may interpret the signs of the barycentric coordinates as described above to output an intersection result that indicates whether the ray hit the triangle. The ray-triangle intersection unit 702 also returns t_num and t_denom to the shader program that requested the ray-triangle intersection test. Note that to get the actual time of intersection, that shader program would have to divide t_num by t_denom. However, that shader program executes in a SIMD unit 138, which already has a divider. A new divider does not need to be included in the ray-triangle intersection unit 702 in order to find t or to determine whether the ray intersected the triangle.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A ray-triangle intersection test unit configured to test for intersection of a ray by a triangle, the ray-triangle intersection test unit comprising:
    a coordinate transformation unit configured to project, into a viewspace of the ray, vertices of the triangle, by transforming the vertices of the triangle and a vertex representative of a direction of the ray, into a coordinate system in which the ray direction has x and y components of 0 and each of the vertices and the ray have z components that are unmodified by the coordinate transformation unit;
    a barycentric coordinate determination unit that determines barycentric coordinates describing the location of the point of intersection of the ray relative to the vertices of the triangle in two-dimensional space; and
    a barycentric interpolation unit configured to generate a numerator and a denominator for a time of intersection of the ray with the triangle, wherein the denominator comprises a sum of the barycentric coordinates multiplied by the z component of the ray direction,
whereby the coordinate transformation unit transforming the ray such that the z component is unmodified allows the ray-triangle intersection test unit to be free of a divider.

2. The ray-triangle intersection test unit of claim 1, wherein the coordinate transformation unit is further configured to translate the vertices of the triangle, and the ray, such that the origin of the ray is the origin of the coordinate system.

3. The ray-triangle intersection test unit of claim 1, wherein the coordinate transformation unit is configured to project the vertices of the triangle into the viewspace of the ray by multiplying the vertices of the triangle by a transformation matrix that scales and shears the x and y components of the vertices of the triangle based on the x, y, and z components of the ray direction.

4. The ray-triangle intersection test unit of claim 3, wherein the transformation matrix comprises:

$$M = \begin{bmatrix} \text{ray\_dir } z \text{ component} & 0.0 & -(\text{ray\_dir } x \text{ component}) \\ 0.0 & \text{ray\_dir } z \text{ component} & -(\text{ray\_dir } y \text{ component}) \\ 0.0 & 0.0 & 1.0 \end{bmatrix},$$

where ray_dir is the ray direction vector.

5. The ray-triangle intersection test unit of claim 1, wherein the barycentric coordinate determination unit is configured to determine the barycentric coordinates as the cross-product of the coordinates of the vertices of the triangle.

6. The ray-triangle intersection test unit of claim 5, wherein the barycentric coordinate determination unit is configured to determine the barycentric coordinates as follows:

$U = Cx*By - Cy*Bx;$ $V = Ax*Cy - Ay*Cx;$ and $W = Bx*Ay - By*Ax;$ where Ax and Ay are x and y components of a first vertex of the triangle, respectively, Bx and By are x and y components of a second vertex of the triangle, respectively, and Cx and Cy are x and y components of a third vertex of the triangle, respectively.

7. The ray-triangle intersection test unit of claim 5, wherein the barycentric interpolation unit is configured to generate the numerator as:

$Az + V*Bz + W*Cz$ where U, V, and W are the barycentric coordinates, Az is the z component of a first vertex of the triangle, Bz is the z component of a second vertex of the triangle, and Cz is the z component of a third vertex of the triangle.

8. The ray-triangle intersection test unit of claim 5, wherein the barycentric interpolation unit is configured to generate the denominator as:

$(U+V+W)*\text{ray\_dir}.z,$ where U, V, and W are the barycentric coordinates and ray_dir.z is the z component of the ray direction.

9. The ray-triangle intersection test unit of claim 8, wherein, for the denominator of the time of intersection, multiplying the sum of barycentric coordinates by the z component of the ray direction causes the time of intersection, defined by the numerator divided by the denominator, to not be scaled by a value equal to the z component of the ray direction, which scaling is introduced by the transformation matrix.

10. A method for testing for intersection of a ray by a triangle by a ray-triangle intersection test unit not including a divider, the method comprising:
projecting, into a viewspace of the ray, vertices of the triangle, by transforming the vertices of the triangle and a vertex representative of a direction of the ray, into a coordinate system in which the ray direction has x and y components of 0 and each of the vertices and the ray have z components that are unmodified;
determining barycentric coordinates describing the location of the point of intersection of the ray relative to the vertices of the triangle in two-dimensional space; and
generating a numerator and a denominator for a time of intersection of the ray with the triangle, wherein the denominator comprises a sum of the barycentric coordinates multiplied by the z component of the ray direction.

11. The method of claim 10, further comprising translating the vertices of the triangle, and the ray, such that the origin of the ray is the origin of the coordinate system.

12. The method of claim 10, wherein projecting the vertices of the triangle into the viewspace of the ray comprises multiplying the vertices of the triangle by a transformation matrix that scales and shears the x and y components of the vertices of the triangle based on the x, y, and z components of the ray direction.

13. The method of claim 12, wherein the transformation matrix comprises:

$$M = \begin{bmatrix} \text{ray\_dir } z \text{ component} & 0.0 & -(\text{ray\_dir } x \text{ component}) \\ 0.0 & \text{ray\_dir } z \text{ component} & -(\text{ray\_dir } y \text{ component}) \\ 0.0 & 0.0 & 1.0 \end{bmatrix},$$

where ray_dir is the ray direction vector.

14. The method of claim 10, further comprising determining the barycentric coordinates as the cross-product of the coordinates of the vertices of the triangle.

15. The method of claim 14, wherein determining the barycentric coordinates occurs as follows:

$U = Cx*By - Cy*Bx;$ $V = Ax*Cy - Ay*Cx;$ and $W = Bx*Ay - By*Ax;$ where Ax and Ay are x and y components of a first vertex of the triangle, respectively, Bx and By are x and y components of a second vertex of the triangle, respectively, and Cx and Cy are x and y components of a third vertex of the triangle, respectively.

16. The method of claim 14, wherein generating the numerator comprises determining $Az + V*Bz + W*Cz$ where U, V, and W are the barycentric coordinates, Az is the z component of a first vertex of the triangle, Bz is the z component of a second vertex of the triangle, and Cz is the z component of a third vertex of the triangle.

17. The method of claim 14, wherein generating the denominator comprises determining $$(U+V+W)*\text{ray\_dir.z},$$

where U, V, and W are the barycentric coordinates and ray_dir.z is the z component of the ray direction.

18. The method of claim 17, wherein, for the denominator of the time of intersection, multiplying the sum of barycentric coordinates by the z component of the ray direction causes the time of intersection, defined by the numerator divided by the denominator, to not be scaled by a value equal to the z component of the ray direction, which scaling is introduced by the transformation matrix.

19. A computing device comprising:
a single instruction multiple data ("SIMD") unit configured to execute a shader program that invokes a ray-triangle intersection test; and
a ray intersection unit configured to perform the ray-triangle intersection test that tests for intersection of a ray by a triangle, the ray-triangle intersection test unit comprising:
a coordinate transformation unit configured to project, into a viewspace of the ray, vertices of the triangle, by transforming the vertices of the triangle and a vertex representative of a direction of the ray, into a coordinate system in which the ray direction has x and y components of 0 and each of the vertices and the ray have z components that are unmodified by the coordinate transformation unit;
a barycentric coordinate determination unit that determines barycentric coordinates describing the location of the point of intersection of the ray relative to the vertices of the triangle in two-dimensional space; and
a barycentric interpolation unit configured to generate a numerator and a denominator for a time of intersection of the ray with the triangle, wherein the denominator comprises a sum of the barycentric coordinates multiplied by the z component of the ray direction,
whereby the coordinate transformation unit transforming the ray such that the z component is unmodified allows the ray-triangle intersection test unit to be free of a divider.

20. The computing device of claim 19, wherein the barycentric coordinate determination unit is configured to determine the barycentric coordinates as the cross-product of the coordinates of the vertices of the triangle.

* * * * *